United States Patent
Bouwer

(10) Patent No.: US 9,205,922 B1
(45) Date of Patent: Dec. 8, 2015

(54) SYSTEMS AND METHODS FOR IMPLEMENTING A PAYLOAD DISTRIBUTION SYSTEM

(71) Applicant: The Boeing Company, Chicago, IL (US)

(72) Inventor: Scott H. Bouwer, Allentown, PA (US)

(73) Assignee: The Boeing Company, Chicago, IL (US)

( * ) Notice: Subject to any disclaimer, the term of this patent is extended or adjusted under 35 U.S.C. 154(b) by 237 days.

(21) Appl. No.: 13/943,965

(22) Filed: Jul. 17, 2013

(51) Int. Cl.
*B64D 9/00* (2006.01)
*B64D 1/22* (2006.01)
*B64C 37/02* (2006.01)
*B66C 13/00* (2006.01)

(52) U.S. Cl.
CPC . *B64D 9/00* (2013.01); *B64C 37/02* (2013.01); *B66C 13/00* (2013.01); *B64D 1/22* (2013.01)

(58) Field of Classification Search
CPC .............. B64D 1/06; B64D 1/22; B64D 7/08; B64D 9/00; B64C 37/02
See application file for complete search history.

(56) References Cited

U.S. PATENT DOCUMENTS

| | | | | |
|---|---|---|---|---|
| 2,721,044 A | * | 10/1955 | Young | 244/2 |
| 2,730,398 A | * | 1/1956 | Huested | 244/17.11 |
| 3,656,723 A | * | 4/1972 | Piasecki et al. | 244/2 |
| 3,801,070 A | * | 4/1974 | Piasecki | 254/285 |
| 6,533,220 B2 | * | 3/2003 | Schuster | 244/118.1 |
| 8,370,003 B2 | * | 2/2013 | So et al. | 701/3 |
| 2009/0299551 A1 | * | 12/2009 | So et al. | 701/3 |
| 2011/0079166 A1 | | 4/2011 | Popa-Simil | |
| 2012/0032025 A1 | | 2/2012 | Allen et al. | |

FOREIGN PATENT DOCUMENTS

DE 19623562 A1 * 12/1997
RU 1648020 C * 10/1994

OTHER PUBLICATIONS

Golubenko et al., PTO-15-103304, Translation of RU 1,648,020 C, Aug. 2015.*

* cited by examiner

*Primary Examiner* — Tien Dinh
*Assistant Examiner* — Richard R Green
(74) *Attorney, Agent, or Firm* — Joseph M. Butscher; The Small Patent Law Group, LLC

(57) ABSTRACT

A distributed payload attachment system includes a payload suspension cable coupled to a payload, a distributed attachment cable having a first anchor point coupled to a first arm of an aerial platform and a second anchor point coupled to a second arm of the aerial platform, and a pulley system operably coupled between the payload suspension cable and the distributed attachment cable, the pulley system generating equal tension across the distributed attachment cable to enable the payload to shift and balance the tension forces in the distributed attachment cable. A method of operating the distributed payload attachment system and an aerial platform including the distributed payload attachment system are also described herein.

20 Claims, 7 Drawing Sheets

SYSTEMS AND METHODS FOR IMPLEMENTING A PAYLOAD DISTRIBUTION SYSTEM

BACKGROUND

The present disclosure relates generally to payload distribution systems and more particularly to systems and methods of distributing forces in an aerial platform having a suspended payload.

It is often desirable to utilize mobile platforms, such as helicopters and/or unmanned aerial vehicles (UAV) to transport various payloads to various destinations. For example, at least some known helicopters include an engine and a rotor coupled to the engine. To transport payloads using the helicopter, a payload attachment point, for supporting the payload, is mounted directly beneath the helicopter such that the payload attachment point is directly in line with the engine and the rotor. Thus, the helicopter utilizes a single centralized lift point that is in line with the rotor such that forces from the payload are distributed directly to the rotor via the engine.

Moreover, it may also be desirable to transport a payload using the UAV. At least one known UAV includes a plurality of arms that extend from a central hub. Each of the arms includes a motor driven propeller that is mounted to a distal end of each of the arms. Moreover, the UAV may be implemented as a fixed rotor vehicle meaning, the yaw, pitch, and/or roll of the propellers is not alterable. Accordingly, to change the yaw, pitch and/or roll of the UAV the power supplied to each of the motors is modulated to change the rotational speed of the propellers.

However, when a payload is attached to known UAVs, the payload may cause bending moments to be introduced into the arms. More specifically, if the UAV has three motors each driving a single propeller, then the UAV has three different lift points. In operation, the propellers provide a force to lift the UAV, whereas the forces induced by the payload tend to pull the payload in an opposite direction. Thus, the payload tends to cause bending moments in the arms supporting the motor/propeller assemblies. One known method of reducing the bending moments in the conventional UAV is to increase structural support between the airframe and the motor/propeller assemblies. For example, increasing a size and thickness of the arms and/or provide additional structural support between adjacent arms. However, increasing the structural support to facilitate reducing the bending moments in the arms may also increase the weight and complexity of the UAV. As a result, the cost of the UAV may be increased and/or the in-flight operational time of the UAV may be reduced.

SUMMARY

In accordance with one embodiment, a distributed payload attachment system for an aerial platform is provided. The distributed payload attachment system includes a payload suspension cable coupled to a payload, a distributed attachment cable having a first anchor point coupled to a first arm of an aerial platform and a second anchor point coupled to a second arm of the aerial platform, and a pulley system operably coupled between the payload suspension cable and the distributed attachment cable, the pulley system generating equal tension across the distributed attachment cable to enable the payload to shift and balance the tension forces in the distributed attachment cable.

In accordance with another embodiment, a method for dispersing payload forces into an airframe of a fixed rotor multi-rotor vehicle is provided. The method includes coupling a payload suspension cable to a payload, coupling a first anchor point of a distributed attachment cable to a first arm of an aerial platform, coupling a second anchor point of the distributed attachment cable to a second arm of the aerial platform, and operably coupling a pulley system between the payload suspension cable and the distributed attachment cable, the pulley system generating equal tension across the distributed attachment cable to enable the payload to shift and balance the tension forces in the distributed attachment cable.

In accordance with a further embodiment, an aerial platform is provided. The aerial platform includes at least one unmanned aerial vehicle (UAV). The UAV includes a hub disposed proximate to a center of gravity of the UAV, a plurality of arms coupled to the hub, and a distributed payload attachment system. The distributed payload attachment system includes a payload suspension cable coupled to a payload, a distributed attachment cable having a first anchor point coupled to a first arm of an aerial platform and a second anchor point coupled to a second arm of the aerial platform, and a pulley system operably coupled between the payload suspension cable and the distributed attachment cable, the pulley system generating equal tension across the distributed attachment cable to enable the payload to shift and balance the tension forces in the distributed attachment cable.

The features, functions, and advantages that have been discussed can be achieved independently in various embodiments or may be combined in yet other embodiments, further details of which can be seen with reference to the following description and drawings.

DETAILED DESCRIPTION

Figure 1:
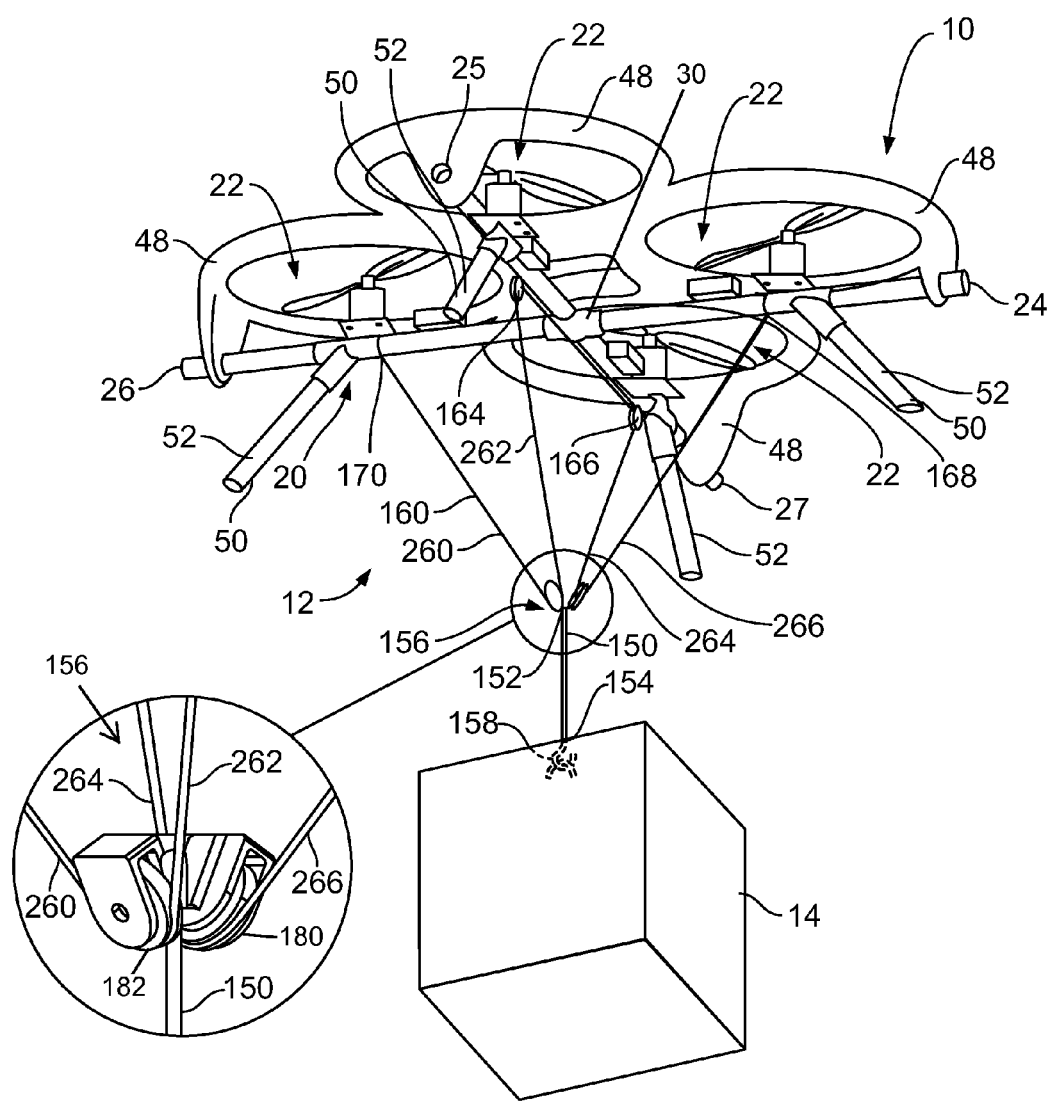
FIG. 1 is a bottom perspective view of an unmanned aerial vehicle (UAV) in accordance with one embodiment.

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Described herein is a distributed payload attachment system for an aerospace vehicle such as an unmanned aerial vehicle (UAV). Although, various embodiments are described herein with respect to a multi-rotor UAV wherein the rotors are implemented as fixed rotors it should be realized the various embodiments described herein may be utilized with any aerial platform. In this regard, an aerial platform may include an aerial vehicle which may further include a manned vehicle or unmanned vehicle. As used herein, fixed rotors means that the pitch of the rotor blades may not be changed to alter the trajectory or flight path of the UAV. It should be realized that the methods and systems described herein may also be utilized to provide a distributed payload attachment system for a manned or piloted vehicle, such as for example, a helicopter or any other commercial or general aviation aircraft. In operation, the distributed payload attachment system disperses the forces generated by a payload into an airframe of the UAV without impacting the maneuverability of the UAV. As a result of distributing the payload forces, a weight of the airframe may be reduced, thereby increasing the Mission radius and/or payload capacity of the UAV in flight.

Figure 2:
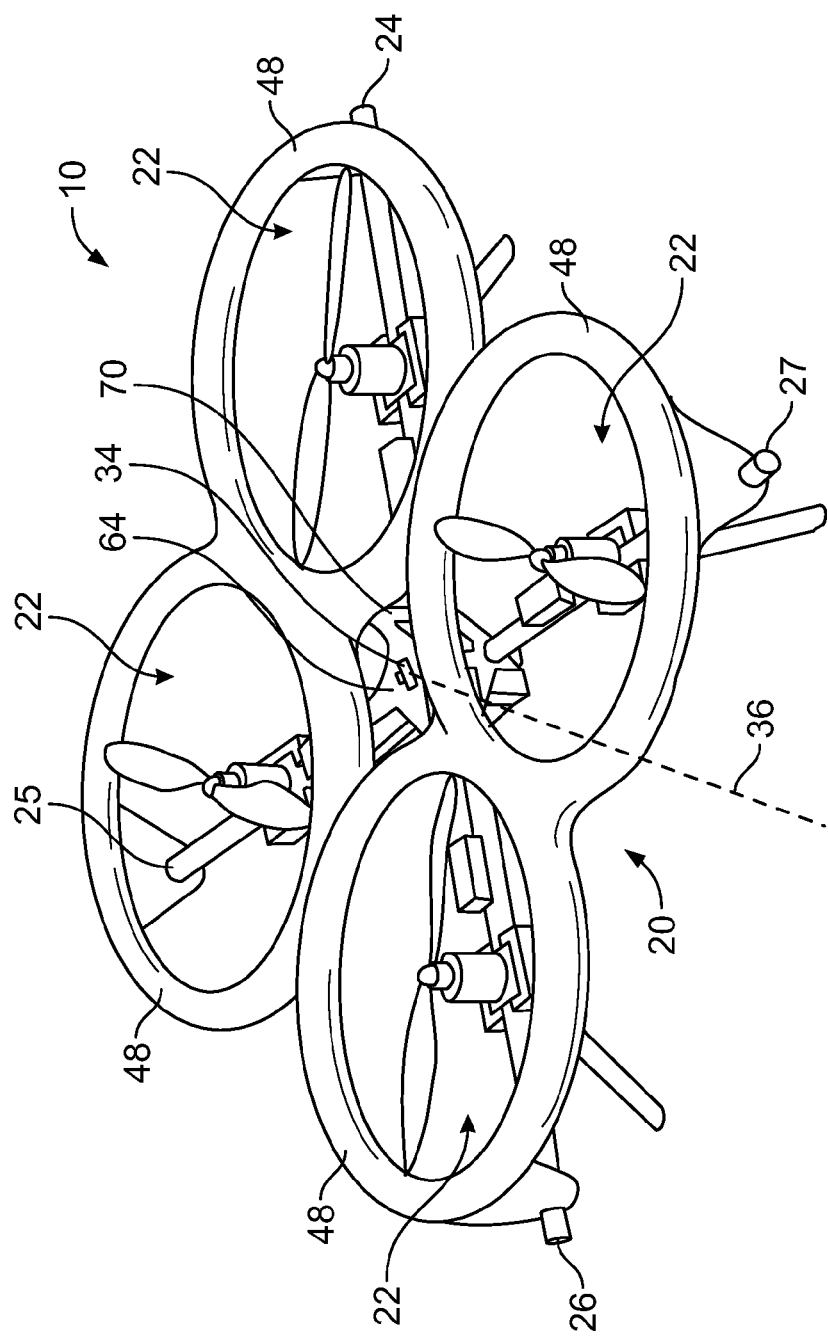
FIG. 2 is a top perspective view of the UAV shown in FIG. 1 in accordance with one embodiment.

FIG. 1 is a bottom perspective view of an exemplary UAV 10 that may be utilized to receive an exemplary distributed payload attachment system (DPAS) 12. In operation, the distributed payload attachment system 12 is utilized to lift and/or transport a payload 14. FIG. 2 is a top perspective view of the UAV 10 shown in FIG. 1. In one embodiment, the UAV 10 includes an airframe 20 and a plurality of propulsion systems 22 coupled to the airframe 20. In general, the airframe 20 forms the structural body or framework for the UAV 10. Moreover, the airframe 20 may be utilized to mount various components, such as for example, a plurality of individual UAV propulsion systems 22 that are described in more detail below. In the illustrated embodiment shown in FIG. 1, the UAV 10 includes four propulsion systems 22, wherein each propulsion system 22 is mounted to a respective arm 24, 25, 26, and 27 as is described in more detail below. Thus, in the illustrated embodiment, the UAV 10 includes four arms 24-27 and a single propulsion system 22 that is mounted to each respective arm 24-27.

In one embodiment, the airframe 20 includes a hub 30 that is configured to receive the plurality of arms 24-27 therein. In the illustrated embodiment, the hub 30 is formed as a single unitary component that includes a plurality of openings (not shown) defined therein. During assembly of the airframe 20, a single arm is inserted into a respective opening. In one embodiment, the openings may be configured as threaded openings to enable each respective arm 24-27 to be threadably coupled to the hub 30. In other embodiments, the arms 24-27 may be coupled to the hub 30 using, for example, a welding procedure, a brazing procedure, an adhesive, or any other suitable means. In operation, a center point 34 of the hub 30 is located at the center of gravity 36 for the UAV 10.

Figure 3:
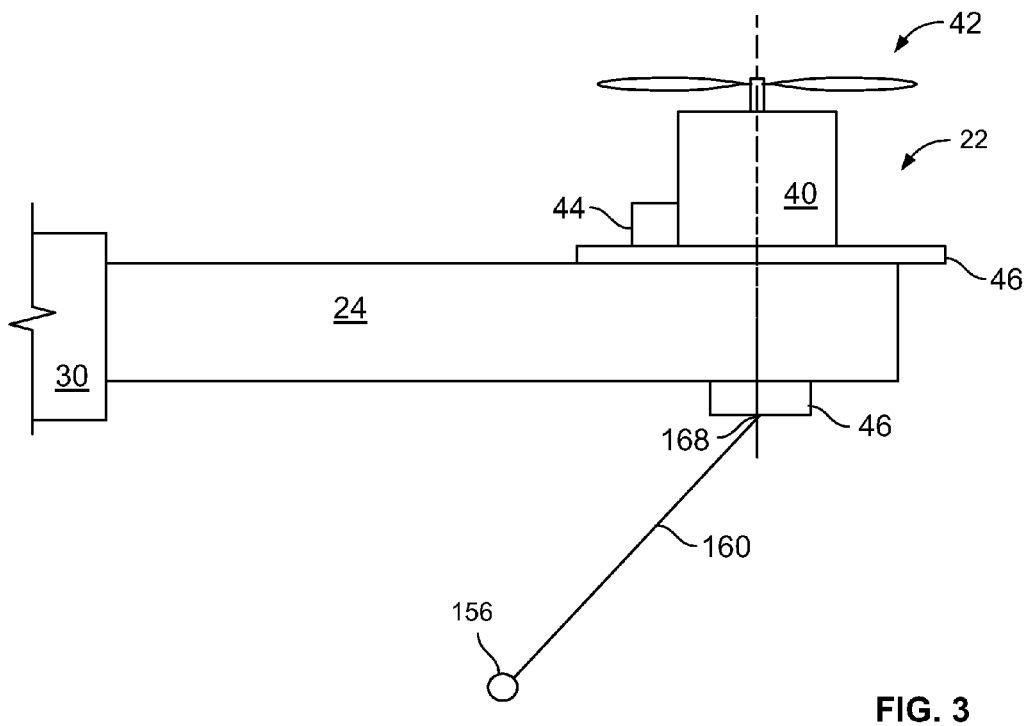
FIG. 3 is a side view of an arm in accordance with one embodiment.

FIG. 3 is a perspective view of the arm 24 including a single propulsion system 22 mounted to the arm 24. Although only a single arm 24 is illustrated in FIG. 3, it should be realized that each of the arms 25-27 shown in FIG. 1 also includes a single propulsion system 22 that is substantially the same as the propulsion system 22 shown and described in FIG. 3. In one embodiment, the propulsion system 22 includes a motor 40 that is configured to drive a rotor 42. The propulsion system 22 also includes a motor controller 44, that is also referred to herein as an electronic speed controller (ESC) that is configured to provide power to the motor 40 and thus control the operational speed of the motor 40. As described above, the rotor 42 is a fixed rotor meaning that the angle, tilt, etc. of the rotor is fixed in a single position. Thus, to maneuver the UAV 10, the operational speeds of the motors 40 are modified, thus modifying the rotational speeds of the rotors 42. In one embodiment, the motor 40 is embodied as a direct current (DC) motor that receives power from the motor controller 44 via a power management system 60 (shown in FIG. 4) and described in more detail below.

In operation, the motor 40 is directly coupled to the rotor 42 such that the rotor 42 operates at substantially the same rotational speed as the motor 40. More specifically, any changes made to alter the rotational speed of the motor 40 results in a substantially linear rotational speed change of the rotor 42. Thus, the motor controller 44 is utilized to control a rotational speed of each of the rotors 42 individually. Because the illustrated embodiment includes four motor controllers 44, the four motor controllers 44 may operate to control the operational speed of four individual rotors 42 via four individual motors 40. In one embodiment, the motor 40 is embodied as a DC brushless outrunner motor that provides a significant power to weight ratio. However, it should be realized that the motors 40 may be implemented using any type of DC motor or any other types of motors.

In one embodiment, the motor 40 is coupled to the arm 24 via a motor mount 46. More specifically, the motor mount 46 is coupled to the arm 24 and the motor 40 is coupled to the motor mount 46. In operation, the motor mount 46 provides a structural support for maintaining the motor 40 and/or motor controller 44 coupled to the arm 24.

Referring again to FIG. 1, in various embodiments the UAV 10 also includes a plurality of shrouds 48 wherein a single shroud 48 is disposed around each respective rotor 42. Accordingly, in the illustrated embodiment, the UAV 10 includes four shrouds 48, each surrounding a respective rotor 42. In operation, the shrouds 48 are configured to prevent the rotors 42 from contacting an object in flight. For example, the shrouds 48 prevent the rotors 42 from contacting a building, the ground, another UAV, etc. Additionally, the shrouds 48 facilitate preventing humans from contacting the rotors 42 while in operation. The UAV 10 further includes a landing gear 50 that provides support for the UAV 10 while the UAV 10 is not in flight. As illustrated, the landing gear 50 includes a plurality of support members 52. In the illustrated embodiment, the landing gear 50 includes four support members 52 wherein each respective support member 52 is coupled to a respective arm 24-27. However, it should be realized that the landing gear 50 may include fewer than four support members 52 or more than four support members 52. Moreover, the support members 52 may be mounted to any part of the airframe 20.

Figure 4:
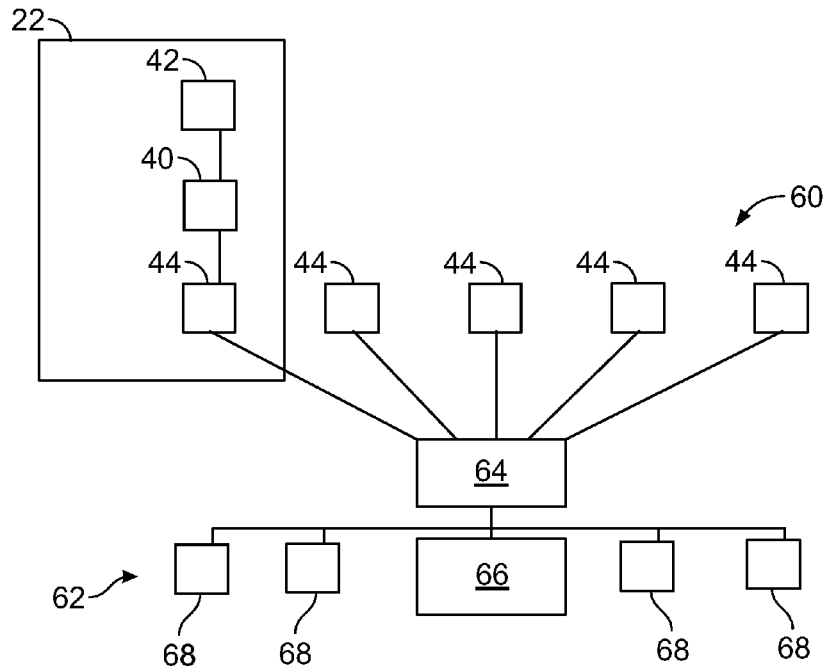
FIG. 4 is a schematic illustration of a power distribution system in accordance with one embodiment.

FIG. 4 is a schematic illustration of the exemplary power management system 60 described above. In various embodiments, the power management system 60 includes a power source 62 and a control module 64 that provides power to each of the motor controllers 44. The power source 62 may be implemented as a single battery pack 66, e.g. a single battery or a plurality of individual batteries housed in a single housing, that is installed proximate to the center of gravity 36. In another embodiment, the power source 62 may be implemented as a plurality of batteries 68 wherein at least one battery 68 is installed proximate to a respective propulsion system 22. In a further embodiment, the power source 62 may be implemented using the battery pack 66 and at least one battery 68 that is installed proximate to a respective propulsion system 22. In operation, the power source 62 provides power to the control module 64 for operating the propulsion systems 22 and various other components mounted on the UAV 10.

Referring to FIG. 2, in various embodiments, the control module 64 is mounted proximate to the center of gravity 36 of the UAV 10 via a bracket 70. The control module 64 may be embodied as a computer. As used herein, the term "computer" may include any processor-based or microprocessor-based system including systems using microcontrollers, reduced instruction set computers (RISC), application specific integrated circuits (ASICs), field programmable gate array (FPGAs), logic circuits, and any other circuit or processor capable of executing the functions described herein. The above examples are exemplary only, and are thus not intended to limit in any way the definition and/or meaning of the term "computer".

In various embodiments, the control module 64 is operable to control the speed of the rotors 42. More specifically, the control module 64 may receive a predetermined flight plan based on a set of flight plan parameters. In response to the flight plan, the control module 64 operates the propulsion systems 22 to move the UAV 10 along the determined flight plan. Optionally, the control module 64 may be configured to receive a manual input from an operator to maneuver the UAV 10 in flight. As discussed above, the control module 64 may also include various other operational components (not shown). For example, the control module 64 may include a plurality of accelerometers, anemometers, speed sensors, etc. Thus, in various embodiments the control module 64 is mounted proximate to the center of gravity 36 which is proximate to the center point of the hub 30.

It should be noted that the various embodiments or portions thereof, such as the UAV 10 may be implemented in hardware, software or a combination thereof. The various embodiments and/or components, for example, the control module 64 may be implemented as part of one or more computers or processors. The control module 64 may include a plurality of ports to enable displays, input devices, or other user interfaces to connect to the control module 64. Moreover, the control module 64 may include a radio frequency (RF) receiver/transmitter to enable information, such as a flight plan or modifications to a flight plan, to be transmitted from and/or transmitted to the UAV 10. Thus, the control module 64 may include Random Access Memory (RAM) and Read Only Memory (ROM). The control module 64 may further include a storage device, which may be a hard disk drive or a removable storage drive such as a solid state drive, optical disk drive, and the like. The storage device may also be other similar means for loading computer programs or other instructions into the control module 64.

The control module 64 executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

In operation, the DPAS 12 is configured to enable a payload, such as the payload 14 shown in FIG. 1, to be coupled to and transported by the UAV 10. Referring again to FIG. 1, in various embodiments, the DPAS 12 also includes a payload suspension cable 150 that is coupled to the pulley carriage 156 via a wire loop, cable clamp, hook, or other acceptable devices. The suspension cable 150 therefore includes having a first end 152 and an opposite second end 154. The payload suspension cable 150 has a first end 152 that is coupled to a pulley carriage 156 containing 2× pulley wheels 180 and 182. The second end 158 of the payload suspension cable 150 contains a hook or other kind of coupling mechanism to interface with and lift payload 14. Thus, the second end 158 may be embodied as a hook, a turnbuckle, or any other suitable device for coupling the payload 14 to the payload suspension cable 150.

The DPAS 12 further includes a distributed attachment cable 160 and a plurality of pulleys 164 and 166 along with pulley wheels 180 and 182 of pulley carriage 156. In operation, the distributed attachment cable 160 is routed through pulleys 164, 166, 180 and 182. Accordingly, the distributed attachment cable 160 has a first anchor point 168, or first end, to attach the distributed attachment cable 160 to the airframe 20 and a second anchor point 170, or second end, to attach the distributed attachment cable 160 to the airframe 20. This arrangement distributes the forces generated by the payload 14 to points proximate to the rotor systems on airframe 20 as described in more detail below. Thus, as shown in FIG. 1, the DPAS 12 includes the distributed attachment cable 160, the first anchor point 168 that is coupled to the arm 24, and the opposite second anchor point 170 that is coupled to the arm 26. As shown in FIG. 1, the first and second anchor points 168 and 170 are mounted to arms 24 and 26, respectively, that are perpendicular to the arms 25 and 27 that are used to mount the pulleys 164 and 166, respectively. Moreover, as shown in FIG. 1 the DPAS system 12 also contains a pulley carriage 156 containing pulley wheels 180 and 182. In operation, the distributed attachment cable 160 is a single continuous cable that when starting from second anchor point 170 on arm 26 is routed down to pulley 182 on carriage 156, back up to pulley 164 on arm 25, across to pulley 166 on arm 27, back down to pulley 180 on carriage 156, and back up to first anchor point 168 on arm 24. This arrangement of anchor points and pulleys creates distribution legs via cable 160 that effectively divide the overall payload forces and provide direct load paths into the airframe proximate to each rotor system. The operation of DPAS 12 is described in more detail below.

In operation, the distributed attachment cable 160 is routed through pulleys 164, 166, 180, 182 to create 4× distribution legs 260, 262, 264, and 266 with each distribution leg having a first end proximate to the airframe and a second end proximate to carriage 156 which is joined to payload suspension cable 150. The first distribution leg 260 is directly under arm 26 with the first end, e.g. anchor point 170, coupled to arm 26 and the second end routed through pulley 180 on carriage 156. The second distribution leg 262 is directly under arm 25 with the second end coming from pulley 180 on carriage 156 and the first end routed through pulley 164 on arm 25. The third distribution leg 264 is directly under arm 27 with the first end coming from pulley 166 on arm 27 and the second end routed through pulley 182 on carriage 156. The fourth distribution leg 266 is directly under arm 24 with the second end coming from pulley 182 on carriage 156 and the first end, e.g. anchor point 168, coupled to arm 24. Since all four distribution legs 260, 262, 264, and 266 are formed from the same continuous cable 160, the cable tension for each distribution leg is the same. Thus, in operation, the distributed attachment cable 160 via the first and second anchor points 168, 170 and the pulleys 164, 166, 180 and 182 operate to distribute a force generated by the payload 14 substantially equally to each of the rotors 42 via the motor mounts 46. For example, assume that the UAV 10 includes four rotors 42 as shown in the illustrated embodiment. Thus, in the illustrated embodiment, approximately one-fourth of the forces generated by payload 14 are transmitted to each lifting rotor 42. Thus, each rotor 42 provides sufficient lift to transport one-fourth of the forces generated by the payload 14. Moreover, because the distributed attachment cable 160 is coupled at the anchor points 168 and 170 and routed through the pulleys 164 and 166, which are each directly in line with a respective rotor 42, the airframe bending loads are minimized as a result of the distributed attachment cable 160 providing a straight line load path from the payload suspension cable 150 via carriage 156 directly to each rotor system 42.

The distributed payload attachment system 12 reduces the weight of the airframe 20 by reducing excess structural supports that may be required to support a payload at a single central lift point. The distributed payload attachment system 12 described herein utilizes, in the illustrated embodiment, four lift points, e.g. the pulley 164, the pulley 166, the anchor point 168, and the anchor point 170, which are each directly under a rotor system. Thus, the forces generated by the payload 14 are introduced directly under each lifting point thus eliminating airframe bending forces that would be present in a multi-rotor configuration with a centralized payload attach point. Thus, additional structure utilized with a vehicle having a single centralized lift point may be eliminated thereby reducing the weight of the UAV 10.

More specifically, using the DPAS 12, the bending loads in the arms 24, 25, 26 and 27 are reduced. The bending loads in the arms are exchanged for a significantly lower compression stress along the arms. If the thrust from the rotors is holding the vehicle up and the payload weight is pulling the vehicle down, there is a horizontal tension component in each of the distribution legs comprised of cable 160 that acts to pull pulley 164, 166 and the anchor points 168 and 170 towards the vehicle center hub 30 resulting in a compression force that is reacted by arms 24, 25, 26 and 27. Therefore the arms merely keep the cables spread apart, thereby increasing the structural efficiency of the airframe therefore reducing airframe weight.

Figure 5:
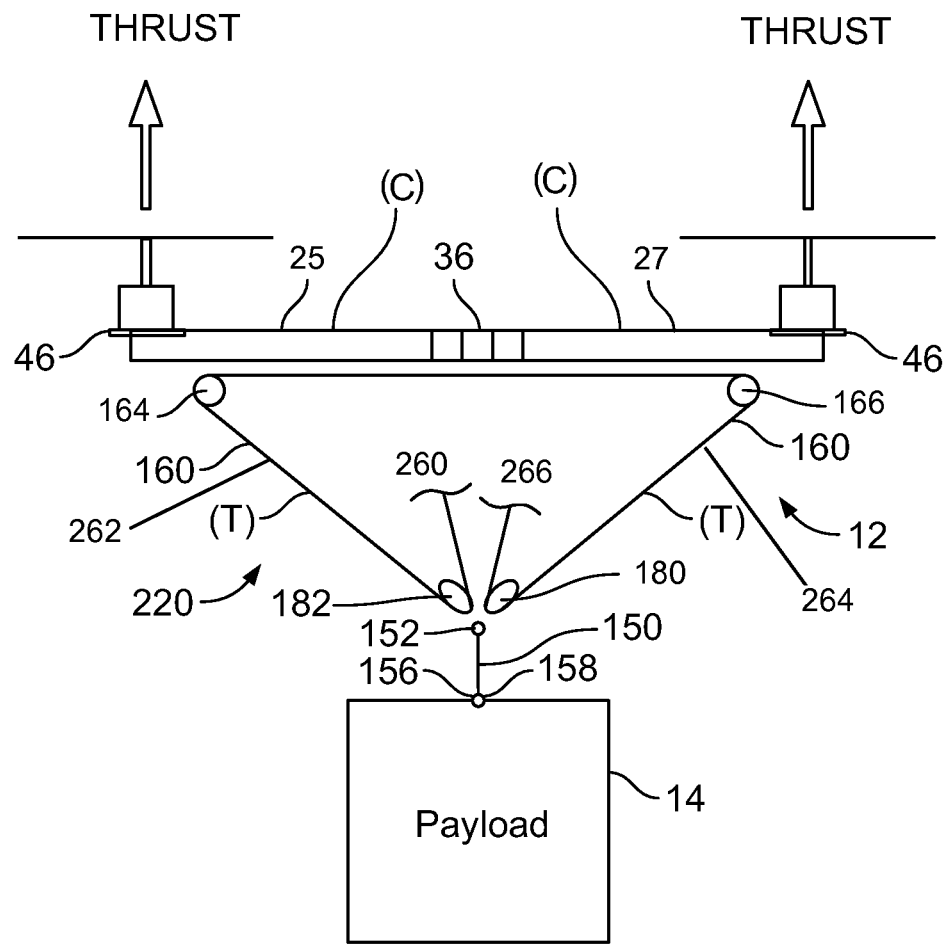
FIG. 5 illustrates a distributed payload attachment system in a first operational configuration in accordance with one embodiment.

For example, FIG. 5 illustrates the distributed payload attachment system 12 in a first operational configuration wherein the payload 14 is extended directly under the center of gravity 36 of the UAV 10. As shown in FIG. 5, the tension forces (T) generated by the payload 14 are distributed directly to the motor mounts 46. Thus, compression forces (C) are induced in the arms 24-27. The compressive and tension loads from this approach result in substantially less airframe stress as compared to the bending loads that would be induced from a center attach point. As a result, the weight or structure forming the arms may be reduced, resulting in an overall reduction in the weight of the UAV 10, which increases the mission radius and/or payload capacity of UAV 10. It should be appreciated that because cable 160 is a single continuous cable routed through pulleys 164, 166, 180 and 182, the tension in each distribution leg 260, 262, 264, and 266 is the same therefore balancing the loads among the 4 attach points relative to the vehicle CG 36, e.g. the anchor points 168 and 170, and the pulleys 164 and 166.

Figure 6:
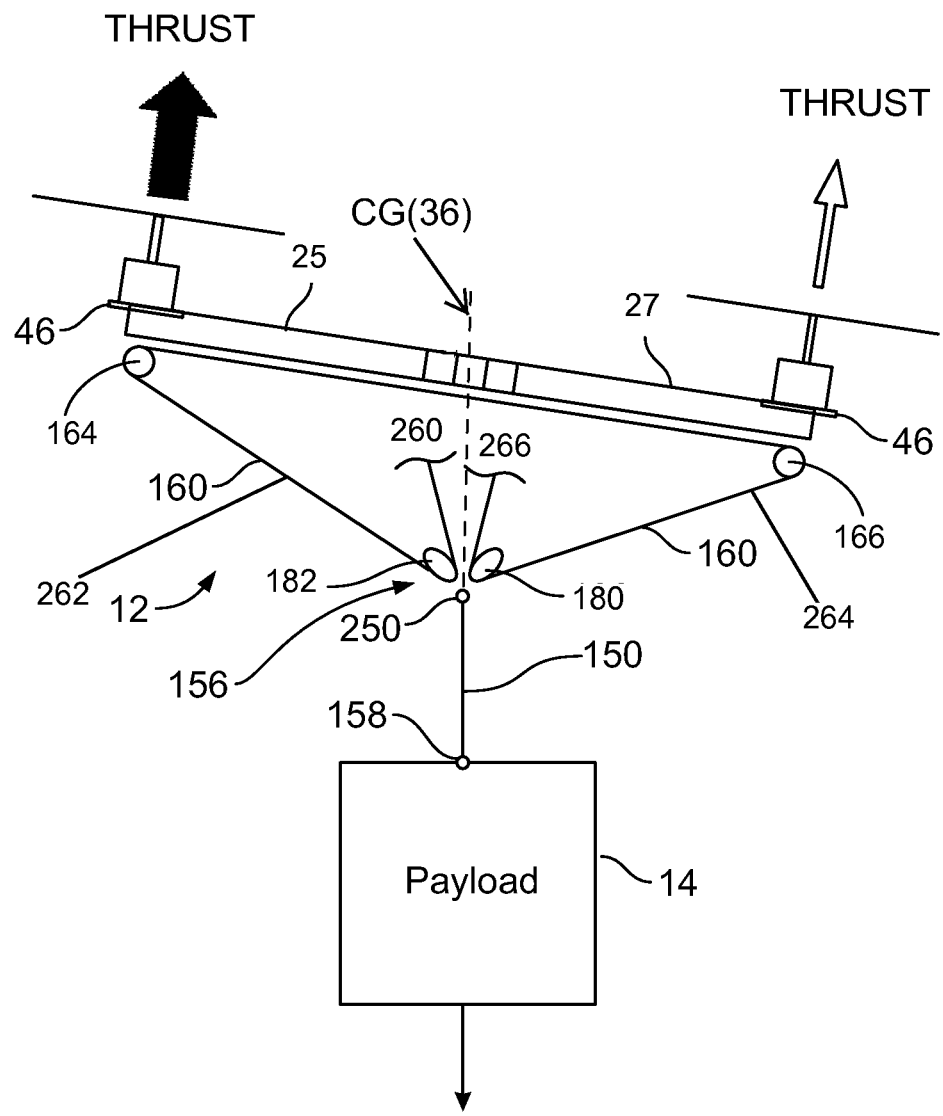
FIG. 6 illustrates a distributed payload attachment system in a second operational configuration in accordance with one embodiment.

FIG. 6 illustrates the distributed payload attachment system 12 in a second operational configuration wherein the UAV 10 is pitching and/or rolling in response to a control input (note larger/smaller thrust forces). The pulleys 164, 166, 180 and 182 force equal tension across continuous cable 160 which causes the payload 14 to shift in order to balance the forces acting on the carriage 156. As a result the payload suspension cable 150 remains vertically aligned with CG 36. This vertical alignment prevents the payload 14 from creating a moment force about the vehicle CG 36 that would inhibit control authority by making it more difficult to pitch and/or roll UAV 10 in response to a control input(s). In summary, the pulleys 164, 166, 180 and 182, in conjunction with the cable 160, cause the payload suspension cable 150 to behave as if it was attached at the vehicle CG (36) while avoiding the high bending forces that would be introduced in arms 24-27 if payload suspension cable 150 were actually attached proximate to the vehicle CG 36. This allows the vehicle 10 to pitch and roll as required for control authority and likewise allows the payload to sway as needed during normal flight maneuvers.

Figure 7:
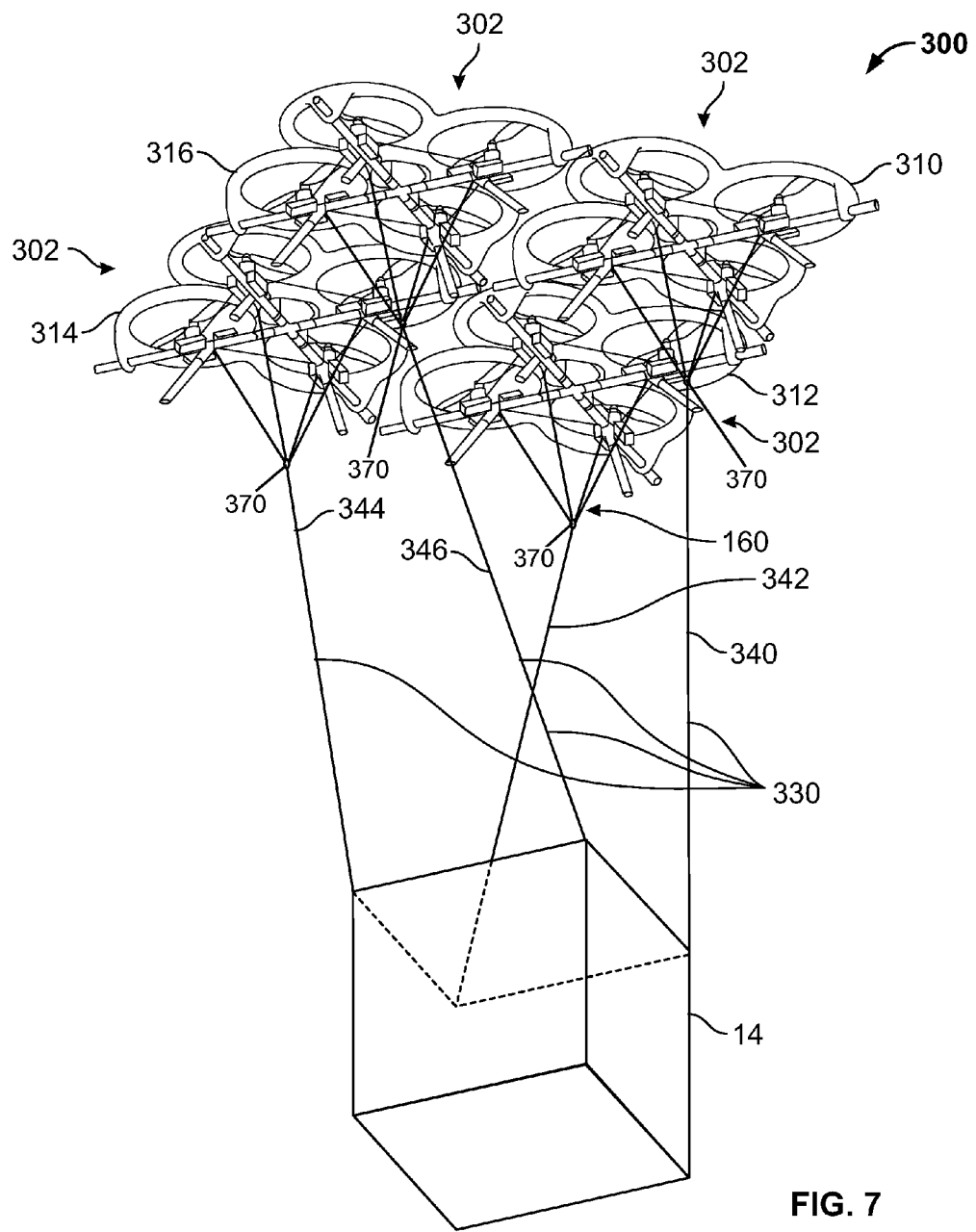
FIG. 7 is a bottom perspective view of an unmanned aerial vehicle (UAV) in accordance with one embodiment.

FIG. 7 is a bottom perspective view of an aerial platform 300 in accordance with one embodiment. In various embodiments, the aerial platform 300 includes a plurality of individual aerial vehicles 302 that operate together to lift the payload 14. For example, the aerial platform 300 may include four aerial vehicles 302, such as aerial vehicle 310, aerial vehicle 312, aerial vehicle 314, and aerial vehicle 316. It should be realized that while the illustrated embodiment shows four aerial vehicles 302 lifting the payload 14, the aerial platform 300 may include two aerial vehicles 302, three aerial vehicles 302, or more than four aerial vehicles 302 to lift the payload 14.

In the exemplary embodiment, each of the aerial vehicles 302 is implemented using the UAV 10 described above. Accordingly, each of the aerial vehicles 302 includes four propulsion systems 22 that are coupled to the airframe 20 as described above and shown in FIG. 1. Moreover, each of the aerial vehicles 302 includes the distributed payload attachment system 12 that includes a plurality of distributed attachment cables 160 that are utilized to lift and/or transport the payload 14 as shown and described in FIG. 1.

More specifically, in the embodiment of FIG. 7, rather than the distributed attachment cables 160 being directly coupled to the payload 14 via the single payload suspension cable 150 shown in FIG. 1, the aerial platform 300 includes a plurality of payload suspension cables 330 that are each coupled to a respective aerial vehicle 302. For example, the payload suspension cables 330 include a payload suspension cable 340 that is coupled to the aerial vehicle 310, a payload suspension cable 342 that is coupled to the aerial vehicle 312, a payload suspension 344 that is coupled to the aerial vehicle 314, and a payload suspension 346 that is coupled to the aerial vehicle 316.

When lifting a common payload with multiple vehicles in formation, the payload suspension cable 150 for each vehicle may not be perpendicular to the rotor plane since each suspension cable 150 will need to converge on the common payload. It should be appreciated that for each vehicle in formation this non-perpendicular angle is easily accommodated by pulleys 164, 166, 180 and 182, shown in FIG. 1, while maintaining a balanced load distribution among each motor mount attach point due to a common tension in continuous cable 160.

Figure 8:
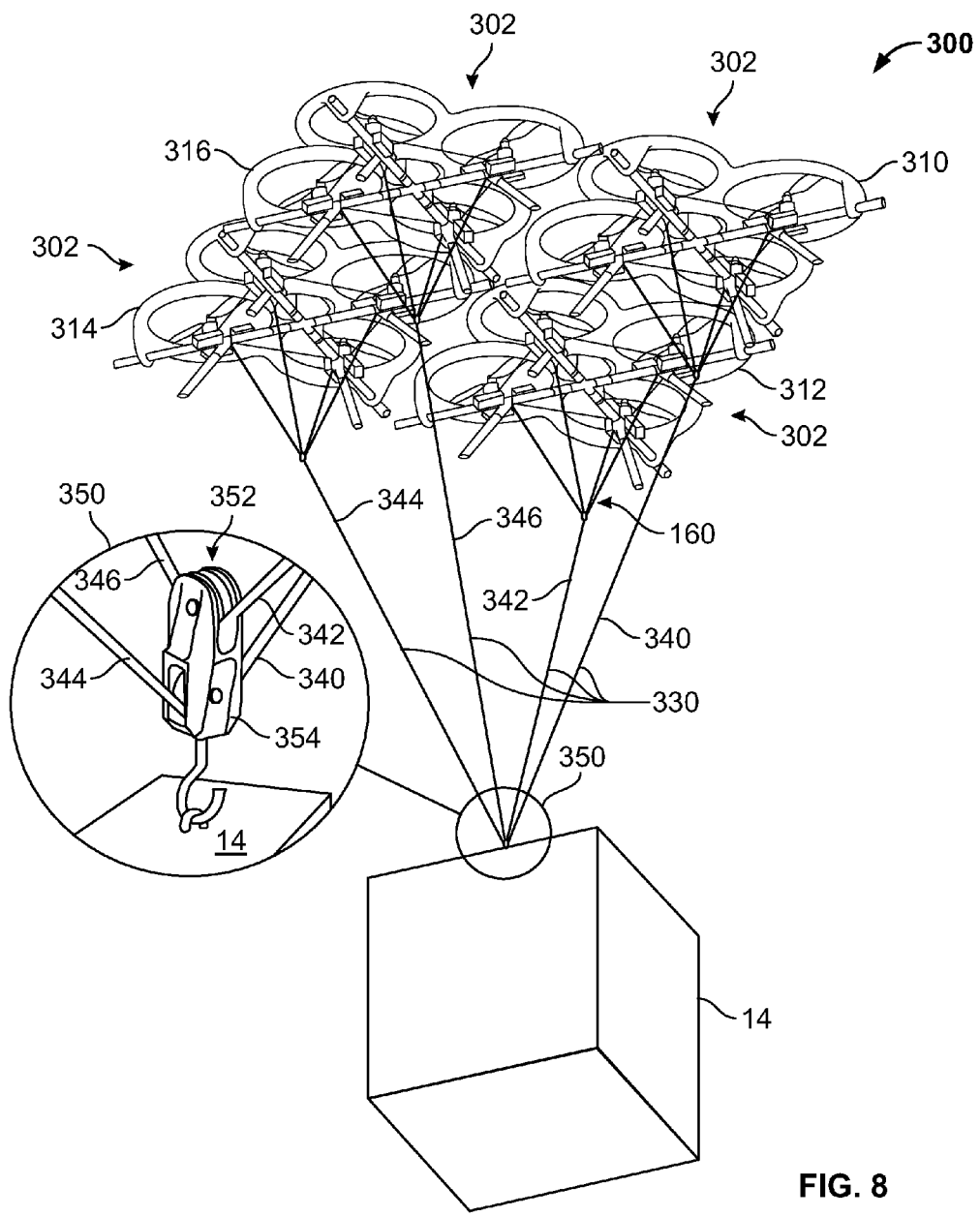
FIG. 8 is a bottom perspective view of an unmanned aerial vehicle (UAV) in accordance with one embodiment.

FIG. 8 shows another cooperative lifting example where it may be beneficial for vehicle formation 300 to balance the load among each payload suspension cable 340, 342, 344, and 346, by including a pulley carriage 350. The pulley carriage 350 is configured with 2× pulley wheels 352 and 354 to accommodate 2× payload suspension cables 342 and 344 to enable the forces exerted by the payload 14 to be equally distributed to, or balanced among, the aerial vehicles 302. In various embodiments, the pulley carriage 350 contains pulleys 352 and 354 that interface with payload suspension cables 340, 342, 344, and 346. For example, the pulley carriage 350 includes a first wheel 352 that enables the payload 14 to be balanced between aerial vehicle 312 and aerial vehicle 316, via the cables 342 and 346 which are formed as a single cable that moves freely along the first wheel 352. Additionally, the pulley carriage 350 includes a second wheel 354 that enables the payload 14 to be balanced between aerial vehicle 310 and aerial vehicle 314, via cable 340 and 344 which are also formed as a single cable that moves freely along the second wheel 354. It should be noted that unlike the DPAS system 12 which is local to each vehicle and contains a single continuous cable 160, pulley carriage 350 incorporates separate cables 342 & 344. This approach avoids a tension force between 2× intermediate attach points 370 which would be required to support the same single cable routing as DPAS 12. The 2× cable routing used by pulley system 350 results in tension and suspension length differences as the payload sways, but at a larger scale, these differences are small and easily absorbed by cable deflection. These minor differences in tension/length are further reduced as the distance between payload 14 and vehicle formation 300 increases.

In operation, the an aerial platform 300 is configured such that the forces generated by the payload 14 are distributed substantially equally to each of the aerial vehicles 302. Thus, in the illustrated embodiment, each aerial vehicle 302 is configured to lift approximately ¼ of the forces generated by the payload 14. Moreover, as described above, the distributed attachment cables 160 of each vehicle facilitate dividing the load seen by each motor mount of the plurality of propulsion systems 22. Thus, in the illustrated embodiment, each propulsion system 22 on a single an aerial vehicle 302 "sees" 1/16 of the forces generated by the payload 14.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A distributed payload attachment system comprising:
    a payload suspension cable coupled to a payload;
    a distributed attachment cable having a first anchor point coupled to a first arm of an aerial platform and a second anchor point coupled to a second arm of the aerial platform; and
    a pulley system operably and directly coupled to the payload suspension cable and the distributed attachment cable, the pulley system generating equal tension across the distributed attachment cable to enable the payload to shift and balance the tension forces in the distributed attachment cable.

2. The distributed payload attachment system of claim 1, wherein the pulley system comprises:
    a first pulley and a second pulley coupled between the payload suspension cable and the distributed attachment cable;
    a third pulley coupled to a third arm of the aerial platform; and
    a fourth pulley coupled to a fourth arm of the aerial platform, the distributed attachment cable being inserted through the first, second, third and fourth pulleys.

3. The distributed payload attachment system of claim 1, wherein the aerial platform comprises:
    a hub disposed proximate to a center of gravity of the aerial platform;
    a plurality of additional arms, wherein the first arm, the second arm, and the plurality of additional arms are coupled to the hub; and
    a plurality of propulsions systems, wherein at least one propulsion system is coupled to each arm.

4. The distributed payload attachment system of claim 3, wherein the pulley system provides a plurality of lift points, wherein each of the plurality of lifts points is directly under a center of a respective one of the plurality propulsion systems.

5. The distributed payload attachment system of claim 3, wherein the pulley system is configured to provide a straight line load path from the payload suspension cable directly to the propulsion systems.

6. The distributed payload attachment system of claim 1, wherein the pulley system is automatically adjustable to maintain the payload proximate to the center of gravity of the aerial platform.

7. The distributed payload attachment system of claim 1, wherein the pulley system is configured to align a tension force generated by the payload with the center of gravity of the aerial platform.

8. The distributed payload attachment system of claim 1, wherein the payload suspension cable comprises:
    a first end directly coupled to a pulley carriage of the pulley system; and
    an opposite second end having a coupling mechanism that interfaces with the payload.

9. The distributed payload attachment system of claim 8, wherein the first end is configured to be axially aligned with a center of gravity of the aerial platform.

10. A method for dispersing payload forces into an airframe of an aerial platform fixed rotor multi-rotor platform, said method comprising:
- coupling a payload suspension cable to a payload;
- coupling a first anchor point of a distributed attachment cable to a first arm of the aerial platform;
- coupling a second anchor point of the distributed attachment cable to a second arm of the aerial platform; and
- operably and directly coupling a pulley system to the payload suspension cable and the distributed attachment cable, the pulley system generating equal tension across the distributed attachment cable to enable the payload to shift and balance the tension forces in the distributed attachment cable.

11. The method of claim 10, further comprising using the pulley system to automatically distribute a force generated by the payload substantially equally to a plurality of propulsion systems on the fixed rotor multi-rotor platform.

12. The method of claim 10, further comprising using the pulley system to automatically form a straight line load path from the payload suspension cable directly to a plurality of propulsion systems on the fixed rotor multi-rotor platform.

13. The method of claim 10, further comprising using the pulley system to substantially prevent a pivot point between the payload suspension cable and the distributed attachment cable from affecting an attitude, yaw, pitch, or roll of the fixed rotor multi-rotor platform.

14. The method of claim 10, wherein the aerial platform comprises a fixed rotor multi-rotor platform, said method further comprising:
- coupling the first anchor point of the distributed attachment cable to a first arm of the fixed rotor multi-rotor platform; and
- coupling the second anchor point of the distributed attachment cable to a second arm of the fixed rotor multi-rotor platform.

15. The method of claim 14, wherein the pulley system comprises a first pulley, a second pulley, a third pulley, and a fourth pulley, said method further comprising:
- coupling the first pulley and the second pulley between the payload suspension cable and the distributed attachment cable;
- coupling the third pulley to a third arm of the aerial platform; and
- coupling the fourth pulley to a fourth arm of the aerial platform, the distributed attachment cable being inserted through the first, second, third and fourth pulleys.

16. An aerial platform comprising:
- at least one unmanned aerial vehicle (UAV), the at least one UAV including,
  - a hub disposed proximate to a center of gravity of the UAV;
  - a plurality of arms coupled to the hub; and
  - a distributed payload attachment system including;
  - a payload suspension cable coupled to a payload;
  - a distributed attachment cable having a first anchor point coupled to a first arm of an aerial platform and a second anchor point coupled to a second arm of the aerial platform; and
  - a pulley system operably and directly coupled to the payload suspension cable the distributed attachment cable, the pulley system generating equal tension across the distributed attachment cable to enable the payload to shift and balance the tension forces in the distributed attachment cable.

17. The aerial platform of claim 16, wherein the at least one UAV comprises a plurality of UAVs coupled together, and the aerial platform further comprising:
- a plurality of additional payload suspension cables, each of the payload suspension cable and the plurality of additional payload suspension cables being coupled to a respective UAV via the distributed payload attachment system.

18. The aerial platform of claim 17, wherein the plurality of payload suspension cables are configured to distribute a force generated by the payload substantially equally to each of the UAVs.

19. The aerial platform of claim 17, wherein the plurality of payload suspension cables are configured to align a tension force generated by the payload with the center of gravity of the aerial platform.

20. The aerial platform of claim 16, wherein the distributed attachment cable is configured to distribute a force generated by the payload substantially equally to each of the arms.

* * * * *